Sept. 29, 1959 R. HASTINGS, JR., ET AL 2,906,373
EXTENSIBLE UPRIGHT FOR LIFT TRUCKS
Filed June 4, 1956 6 Sheets-Sheet 1

FIG. 1

INVENTORS.
ELMER R. BACKOFEN
RUSSELL HASTINGS JR.
BY
Brown, Jackson, Boettcher & Dienner
ATTYS.

Sept. 29, 1959   R. HASTINGS, JR., ET AL   2,906,373
EXTENSIBLE UPRIGHT FOR LIFT TRUCKS
Filed June 4, 1956                                6 Sheets-Sheet 2

INVENTORS.
ELMER R. BACKOFEN
RUSSELL HASTINGS JR.
BY Brown, Jackson, Boettcher & Dienner
ATTYS.

Sept. 29, 1959    R. HASTINGS, JR., ET AL    2,906,373
EXTENSIBLE UPRIGHT FOR LIFT TRUCKS
Filed June 4, 1956    6 Sheets-Sheet 3

INVENTORS.
ELMER R. BACKOFEN
RUSSELL HASTINGS JR.
BY
Brown, Jackson, Boettcher & Dienner
ATTYS.

Sept. 29, 1959 R. HASTINGS, JR., ET AL 2,906,373
EXTENSIBLE UPRIGHT FOR LIFT TRUCKS
Filed June 4, 1956 6 Sheets-Sheet 4

INVENTORS.
ELMER R. BACKOFEN
RUSSELL HASTINGS JR.
BY
Brown, Jackson, Boettcher & Dienner
ATTYS.

Sept. 29, 1959 R. HASTINGS, JR., ET AL 2,906,373
EXTENSIBLE UPRIGHT FOR LIFT TRUCKS
Filed June 4, 1956 6 Sheets-Sheet 5

INVENTORS
ELMER R. BACKOFTEN
RUSSELL HASTINGS JR.
BY
Brown, Jackson, Boettcher & Dienner
ATTYS.

United States Patent Office 2,906,373
Patented Sept. 29, 1959

2,906,373

EXTENSIBLE UPRIGHT FOR LIFT TRUCKS

Russell Hastings, Jr., and Elmer R. Backofen, Battle Creek, Mich., assignors to Clark Equipment Company, a corporation of Michigan Application June 4, 1956, Serial No. 589,162

8 Claims. (Cl. 187—9)

This invention relates generally to industrial lift trucks, and more specifically, to an improved extensible upright or mast assembly used in supporting load engaging means, such as a lift fork, employed with industrial lift trucks to which the present invention pertains and which are generally employed for elevating, storing, transporting and otherwise handling merchandise and other load materials. The load engaging fork is normally carried by a vertical extensible mast or upright structure located at the forward end of the industrial vehicle. Such fork engages the load and is thereafter raised to desired elevation in which position the same is normally transported to a desired location and thereat unloaded. The upright mast for supporting such a load engaging fork means is normally secured in a stationary position and preferably includes means for its vertical extension so as to maintain minimum vertical retracted height while at the same time providing maximum elevation of the load engaging means.

In general, such extensible upright assemblies or masts of previously known constructions, have included a stationary assembly fixed to the industrial lift truck and a movable assembly including a pair of slidingly extensible or telescopingly arranged rail members movable relative to the stationary assembly. Such previous structures have maintained minimum retracted height and provided means for elevating the load engaging means above the normal vertical dimension of the stationary mast portion. The present invention seeks to improve the general features and concepts of the extensible mast structure by providing an increased maximum vertical extension while maintaining minimum vertical height of the stationary mast portion. Broadly speaking, the improved mast of our invention embodies a pair of extensible sections, telescopingly arranged one within the other and with respect to the stationary portion of the mast, and novel latch or lock means for holding the extensible sections of the mast structure in their extended condition.

An object of this invention is to provide a new and improved double-acting latch means operable at the extension of a telescoping upright mast of an industrial lift truck and capable of locking load engaging means in its position of highest elevation.

Another object of our invention is to provide latch means for an extensible upright assembly of the character aforesaid which operates to successively couple an extensible mast section to two separate hydraulically actuated lifting means and to lock load engaging means to said extensible mast section.

The above and further objects, features and advantages of our invention will be apparent to those familiar in the art from the following detailed description of a preferred embodiment of our invention, illustrated in the accompanying drawings.

In the drawings:

Figures 8a, 8b and 8c are schematic showings of portions of the mast construction and associated latch mechanism of this invention in which Figure 8a illustrates the position of the parts when the mast structure is in fully extended position, 8b illustrates the position of the parts when the mast is in an intermediate position and Figure 8c illustrates the position of the parts when the mast is fully retracted;

Figure 1:
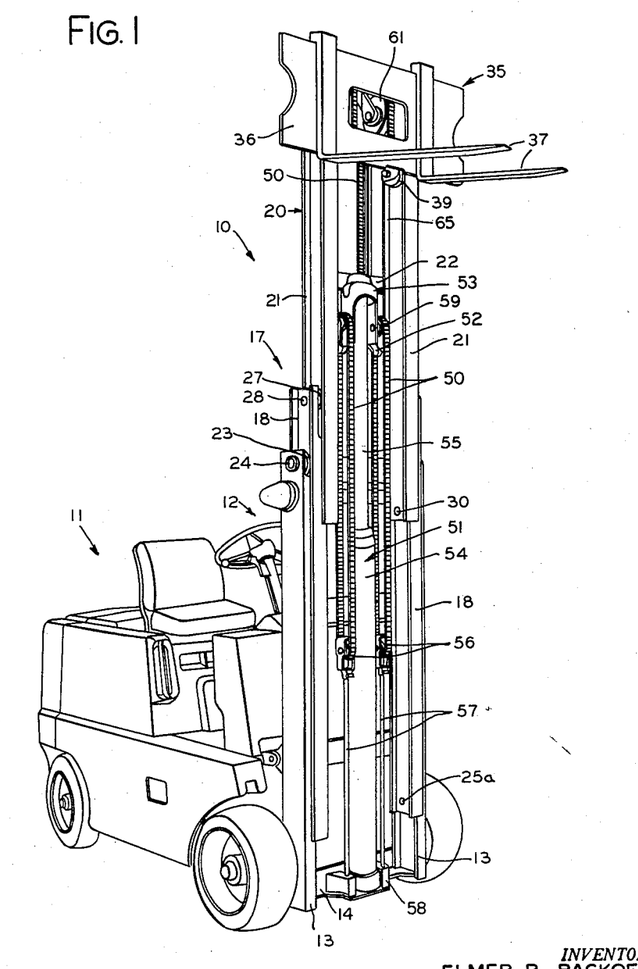
Figure 1 is a perspective view showing the three-part mast assembly of our invention in association with a conventional industrial lift truck.

Turning now to the features of the present invention, as illustrated in the drawings, it will be understood from Figure 1, in particular, that our mast assembly, indicated generally at 10, is used in conjunction with a conventional industrial lift truck 11. The mast assembly includes a stationary section 12 comprising a pair of laterally spaced apart channel members 13, 13 suitably cross braced adjacent their ends by members 14 and 15 to form stationary upright frame section having a mounting means 16 at its lower end by which such is firmly secured to a base or support, such as the industrial truck 11. The truck embodies operating mechanism familiar in the art, including a prime mover, such as an internal combustion engine, equipment providing hydraulic fluid under pressure, suitable driving and control mechanism, and means transmitting pressurized fluid through the control mechanisms to a means for extending and retracting our new mast or upright assembly 10, as will now be set forth.

The channel members 13, substantially C-shaped in cross-section, oppose each other and are arranged to receive an intermediate mast section 17 formed of two laterally spaced I-beams 18, 18; such beams being suitably cross-braced by members 19,19 to form a rigid rectangular structure. Such intermediate upright section 17 is roller supported and arranged for longitudinal movement relative to the stationary upright frame members 13, 13, as will be hereinafter described.

In addition to the intermediate extensible section 17, an inner extensible mast section 20 is also included; such comprising a pair of laterally spaced I-beam members 21, 21, cross-braced by two brace members 22, 22 to form a rectagular frame structure, similar to extensible section 12 and telescopingly arranged inwardly of the I-beams 18, 18 of the latter section.

Figure 11:
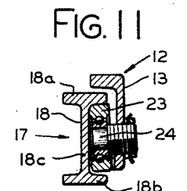
Figure 11 is a detail cross-sectional view taken along the line 11—11 of Figure 2 looking in the direction indicated by the arrows.
Figure 11A:
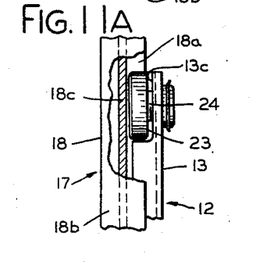
Figure 11a is an elevational view, partially broken away, of the parts shown in Figure 11.

The intermediate extensible section 17 is supported by two sets of rollers, one set 23, 23 being carried, as best shown in detail in Figures 11 and 11a, at the upper end of the C channels 13, 13 of the stationary upright section 12 on stub shafts 24, 24.

Figure 2:
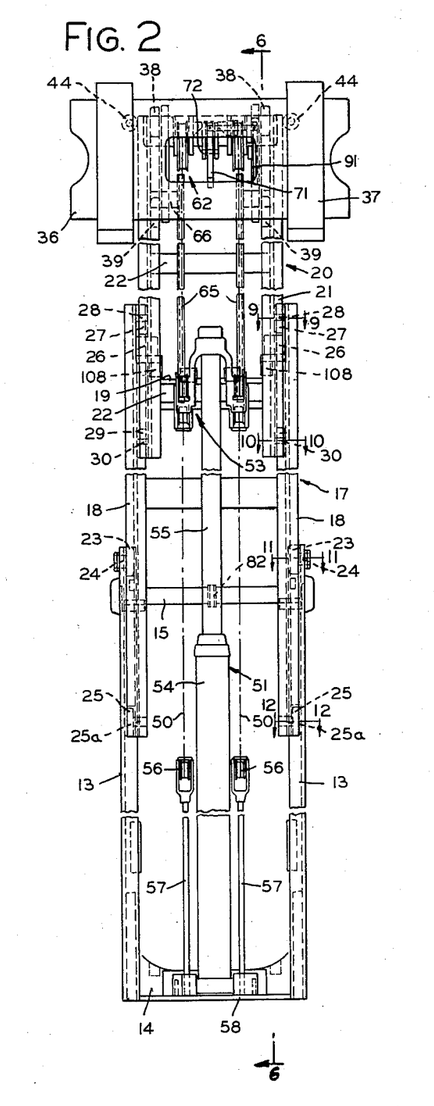
Figure 2 is a front elevational view of the mast structure shown in Figure 1.
Figure 4:
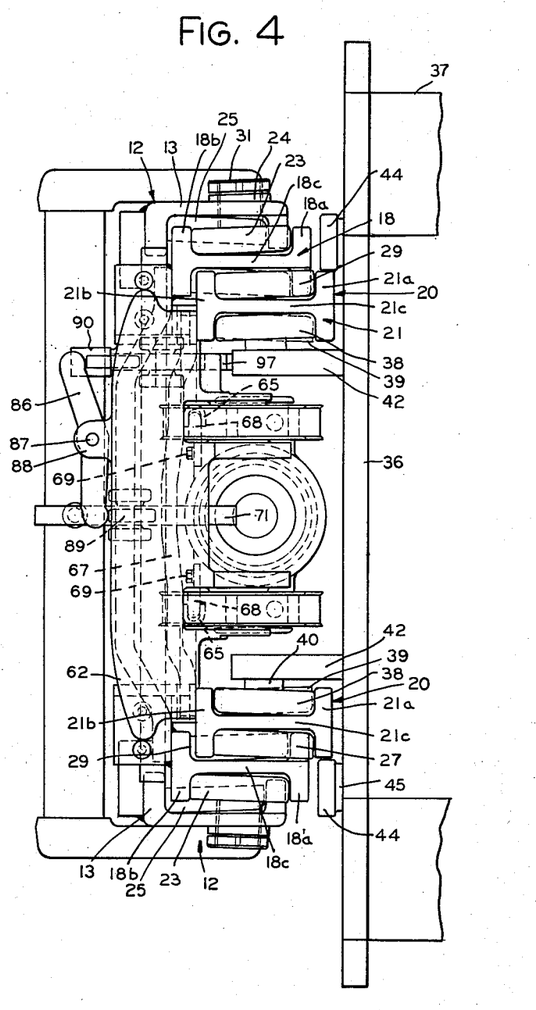
Figure 4 is a top plan view of the same.
Figure 5:
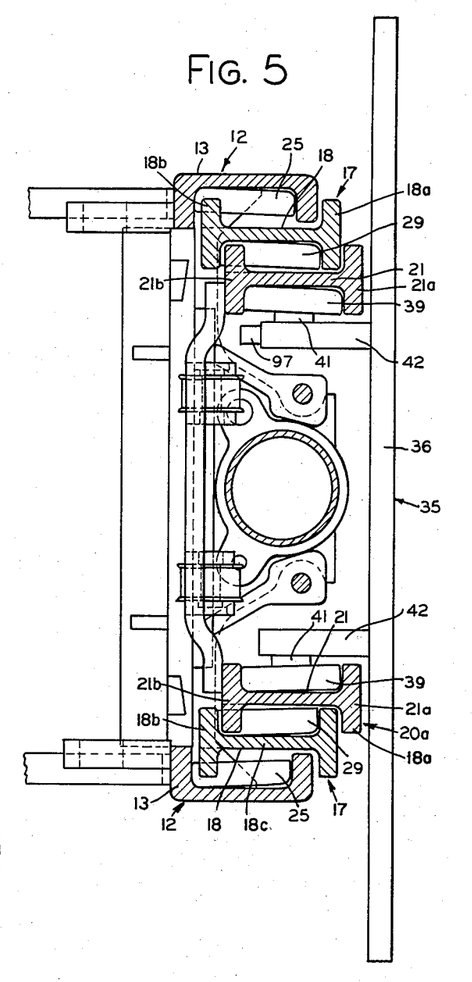
Figure 5 is a cross-sectional view of the same taken at line 5—5 of Figure 6 and looking in the direction of the arrows thereon.
Figure 12:
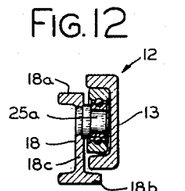
Figure 12 is a detail sectional view taken along the line 12—12 of Figure 2 looking in the direction indicated by the arrows.
Figure 12A:
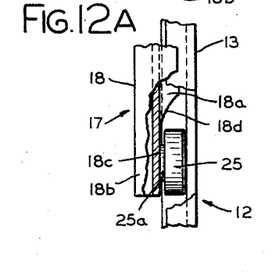
Figure 12a is an elevational view, partially broken away, of the parts shown in Figure 12.

As generally shown in Figures 2, 4 and 5 and in detail in Figures 12 and 12a, the second set of rollers 25, 25 rotate on stub shafts 25a, 25a at the lower end of I-beams 18, 18 of intermediate mast section 17. Rollers 23 ride between flange portions 18a and 18b of beams 18 along the outside face of web wall 18c thereof. As shown in Figures 11 and 11a, the upper end portions of channels 13 adjacent flange 18b of I-beams 18 are cut away as at 13c to dispose rollers 23 as aforementioned. Rollers 25, 25 ride in the recess of the C-channels 13. It will also be seen upon reference to Figures 12 and 12a that the lower portions of flanges 18a of I-beams 18 are cut away as at 18d to afford positioning of rollers 25 in the recesses of channels 13. Such two sets of rollers 23 and 25 serve to support the intermediate upright section 17 for longitudinal movement relative to the stationary upright section 12. The I-beams 18, 18 also carry, adjacent their upper ends, as shown in Figure 2, a pair of stop blocks 26, 26 for purposes which will appear presently.

Figure 9:
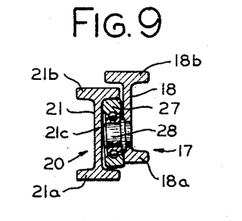
Figure 9 is a detail cross-sectional view taken substantially along the line 9—9 of Figure 2 looking in the direction indicated by the arrows.
Figure 9A:
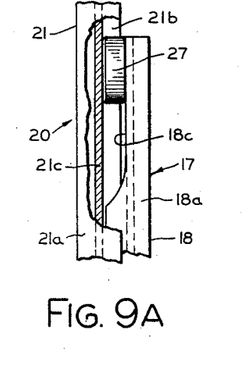
Figure 9a is an elevational view, partially broken away, of the parts shown in Figure 9.

Additional sets of rollers 27, 27 on stub shafts 28, 28 extend inwardly of the upper ends of I-beams 18, 18, the flanges 18a of which, as best shown in Figures 9 and 9a, are cut away as at 18e to provide for engagement of the rollers 27, 27 with the outer face of web walls 21c of I-beams 21, between flange portions 21a and 21b thereof to support the inner extensible section 20.

Figures 10, 10A, 13:
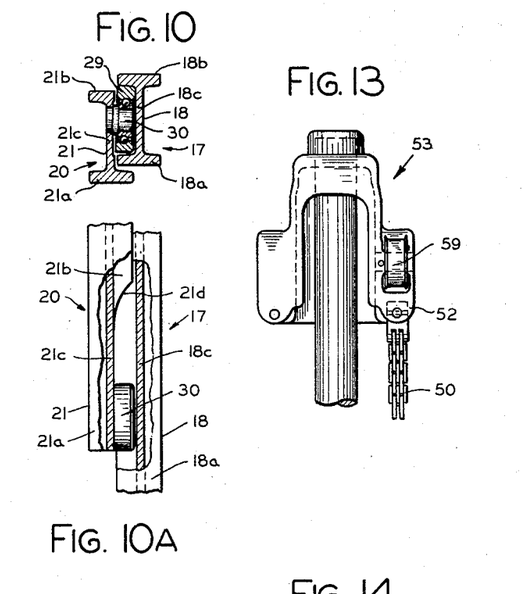
Figure 10 is a detail sectional view taken along the line 10—10 of Figure 2 looking in the direction indicated by the arrows.
Figure 10a is an elevational view, partially broken away, of the parts shown in Figure 10.
Figure 13 is a detail elevational view showing the manner in which lifting chains are secured to the piston crosshead assembly for effecting raising and lowering of the mast.

The inner section 20 likewise carries a set of rollers 29, 29 on shafts 30, 30 (see Figure 10) disposed adjacent the lower ends of I-beams 21, the flange 21b of which, as best shown in Figures 10 and 10a, are cut away as at 21d to provide for rolling engagement of the rollers 29, 29 with flange portions 18a and 18b, adjacent the innermost face of web wall 18c of the I-beam members 18, 18; the latter being associated with intermediate slide section 17.

From the foregoing, it will be understood and appreciated that the intermediate and inner extensible mast sections 17 and 20 are supported by roller sets 23—25 and 27—29, respectively, such that both the intermediate and inner sections are movable relative to the outer or stationary upright section 12 to provide an upright mast assembly having multiple extensible sections.

The features of such rollers and their details of operation and construction are more amply set forth in our copending application, Serial No. 760,744, filed September 12, 1958, and entitled Lift Truck. Briefly, however, it will be noted that the rollers 23 carried at the upper end of the stationary upright channel members 13 are canted slightly or tow outwardly from a true transverse relation with respect to the web wall 31 of their associated C-channel members 13. Likewise, the rollers 27 carried on the intermediate sliding mast section 17 for engaging the outside of the I-beam members 21 at flanges 21a and 21b of the inner slidable section 20 are canted on axes paralleling the axis of rotation for rollers 23. This relationship may best be understood by examining Figure 4 of the drawings. The offsetting of the axis of rotation for rollers 23 and 27, as defined by their respectively associated stub shaft portions 24 and 28 is approximately 2° with respect to a true transverse relationship with a longitudinal axis taken through the truck 11. On the other hand, the sets of rollers 25 and 29 located adjacent the lower ends of the mast sections 17 and 21, respectively, are canted in an opposite direction, as best viewed in the cross-sectional view of Figure 5. These sets of rollers 25 and 29 take the forward bending stress of the mast structure as the extensible upright sections are raised and lowered, while the reverse is true of the upper disposed sets of rollers 23 and 27. In all cases, the rollers are cocked at a 2° angle with respect to true transverse relation with their associated mast channel members or beams 13, 18 or 21, as the case may be. Thought of in a different manner, such rollers are canted at 2° with respect to a plane disposed transversely to the longitudinal axis of the truck 11. As mentioned previously, the particulars of this novel roller arrangement are better set forth in our copending application Serial No. 760,744, referred to hereinabove.

A load carriage or load engaging means 35 including an apron 36 and lifting or fork arms 37 is provided; such being a conventional type customarily used in industrial lift trucks, stackers and other related mechanisms of this class. Such load carriage or load engaging means is fitted to the inner extensible section 20 so as to be movable longitudinally therealong. In this regard, carriage 35 is provided wtih two sets of rollers 38 and 39; the roller set 38 being positioned adjacent the upper end of the carriage and the roller set 39 being positioned adjacent the lower end thereof. These rollers are carried by stub shafts 40 and 41, respectively, fixed to laterally spaced apart flanges 42, 42 located on and projecting from the rear face of apron 36 to extend rearwardly therefrom toward and inwardly of the I-beams 21. Each flange member carries an upper roller 38 and a lower roller 39, with such rollers thereby engaging the inner face of the central web wall 21c of one of the I-beams 21 between flange portions 21a and 21b. Carriage 35 is thus fitted for longitudinal movement with respect to the extensible upright section 20. It will be noted that the upper and lower rollers of the carriage assembly are cocked slightly or that is, turned at an angle with respect to a longitudinal axis taken through the truck, similar to the cocking or canting of the previously described sets of rollers of the mast structure. In particular, the upper rollers 38 are turned in one direction and the lower rollers 39 are turned in an opposite direction. In the embodiment of the invention shown, the upper rollers 38 are cocked about 2° so that, as viewed in plan Figure 5, there is a clearance between the upper roller and flange 21b while the rollers 39 are cocked to provide clearance with flange portion 21a of beam 21.

To provide lateral stability of the carriage, the same is equipped with two additional rollers 44, 44. These rollers are each carried on a stub shaft member 45 fixed to and extending from the rear face of apron 36. Such stub shafts are disposed adjacent the top end of the apron in line with rollers 38 and are so located on the apron that one of the rollers will contact and ride on one outside edge of the flange portion 21a of each of the I-beams 21. This relation may best be understood by examining Figure 4 of the drawings. Note, in this regard, that only two such stabilizing rollers 44 are used instead of a greater number as has been the practice in previous structures of this class. The reason for this lies in our discovery that a single roller engaging the outer side edge of each beam 21 will cooperate with a lower roller 39 on the inside of such beam to provide a couple resisting force tending to restrain the carriage from tilting sideways. The lateral forces will be taken therefore by a single upright 21 depending upon which side of the carriage is involved in the load problem.

Figure 3:
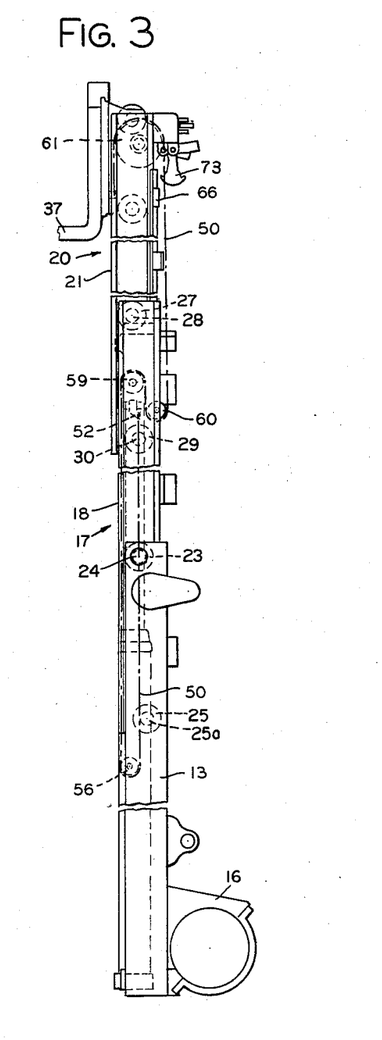
Figure 3 is a side elevational view of the mast structure shown in Figure 1.
Figure 14:
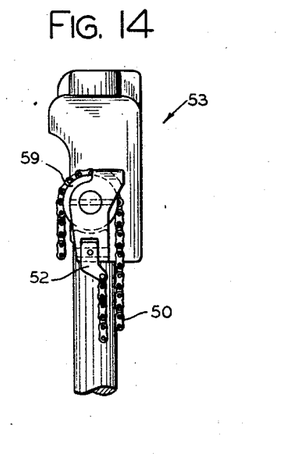
Figure 14 is a side elevation of the parts shown in Figure 13.

The carriage assembly and the extensible upright sections 17 and 20 are operated through the medium of a pair of flexible link chains 50, 50, and an hydraulic ram mechanism 51. Each chain 50 is fastened at one end to a toggle member 52 associated with a piston cross head assembly 53 (shown in large detail in Figures 13 and 14) engaged by the hydraulic ram 51 and comprising a cylinder 54 and an extensible piston rod 55. Each chain leads from the cross head 53 downwardly to one of a pair of first idler sheave wheels 56, 56 mounted rotatably at the upper ends of upwardly extending rod members 57 fastened to a suitable base plate 58 associated with the outermost or stationary upright mast section 12. In this regard, the association of the chain and the idler wheels 56 will best be understood by inspecting Figure 2 of the drawings. After the chains pass over the idlers 56, which are fixed in their vertical position by rod members 57, the same are extended upwardly and train over a second set of idler sheave wheels 59 (see Figures 13 and 14) rotatably carried by the piston cross head member 53 vertically above the connector means 52 which holds one end of the chains 50. A third set of idler wheels 60, as best shown in Figure 3, are attached to and disposed adjacent the lower end of the inner extensible mast section 20. The chain members 50 are trained under and over such wheels 60 after they leave the second set of idlers 59. From the wheel members 60, the chain members 50 extend upwardly to and around a pair of larger idler wheels 61 disposed adjacent the upper end of the inner section 20 and specifically rotatably supported on a top cross tie member 62 fixed to and between the upper end of the I-beams 21. The opposite or other end of the chains 50 are thereafter fixed to the load engaging assembly 35 adjacent the lower end of the apron 36 thereon. The particular chain and sheave wheel arrangement illustrated provides a normal ratio of movement between the load engaging assembly 35, and the movement of the piston actuated cross head 53 at 3:1 as will be amplified in greater detail presently.

The cross head assembly 53 is carried at one end of the piston rod 55 (see Figure 2) with the opposite end of such piston rod being housed in a hydraulic cylinder 54 of the ram assembly. To guide the cross head in its movement with respect to the inner slide section 20, a guide means in the form of a pair of laterally spaced channel members 65, 65 are provided; the same being rigidly secured at their upper ends to the I-beams 21 by bracket members 66, 66 extending inwardly of the inner faces thereof so that such channels 65 reside between the spaced rails 21, 21 and in parallelism therewith. The lower ends of the channel members 65 are secured to the lower cross tie 22, as best shown in Figure 2 of the drawings. The cross head assembly 53 has a horizontal bar 67 (Figure 4) having guide members 68 fixed to each end thereof by cap screws 69. During initial upward movement of the piston rod 55 and cross head 53, the guide members 68 slide along the channels 65 to guide the cross head. Upon lowering of the extensible mast section 20 and during the final raising of the same to a fully extended condition, the guide rails 65 move relative to the cross head assembly 53 and serve to hold and guide the cross head at all times.

The aforedescribed mast or extensible upright structure is disclosed and claimed in our copending application Serial No. 760,744, filed September 12, 1958, which application is a division of the present application and a continuation of our copending application Serial No. 589,156, filed June 4, 1956, now abandoned in favor of said application Serial No. 760,744.

Associated with the upper cross tie member 62 is an improved double-acting latch mechanism, indicated generally by numeral 70, which functions in association with the lifting or raising of the inner extensible section 20 for the locking of the carriage assembly 35 in its fully raised condition for locking and unlocking the inner slide section 20 with cross head 53 and for locking the inner and outer sections together. To better understand this structure, reference should be made to Figures 1, 2, 4, 6, 7 and 8a–8c of the drawings.

Figure 6:
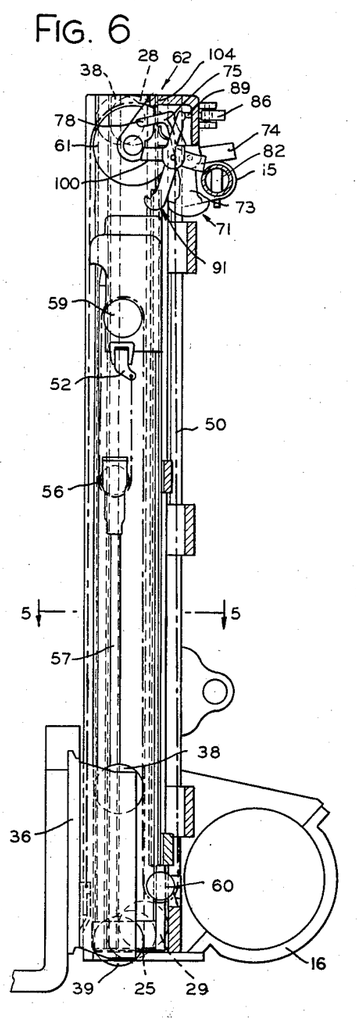
Figure 6 is a longitudinal cross-sectional view of our new mast structure showing the same in fully retracted position and taken substantially along line 6—6 of Figure 2 and looking in the direction of the arrows thereon.
Figure 7:
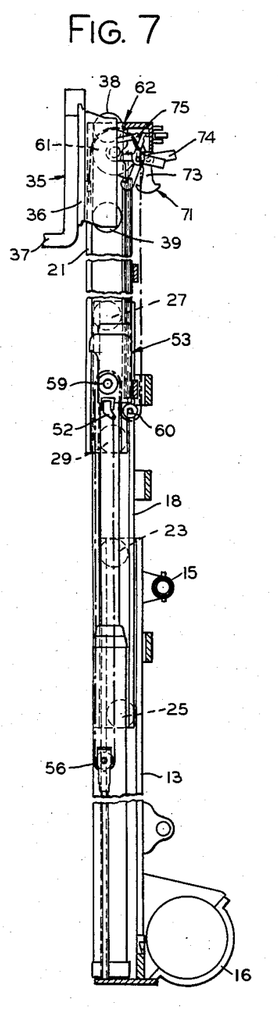
Figure 7 is an additional longitudinal cross-sectional view, similar to Figure 6, showing the mast structure of our invention in a fully extended condition.

The latch assembly 70 includes a first latch member 71 mounted for pivotal movement on a horizontally disposed pin 72 and substantially on the longitudinal center line of the mast assembly 10; such pin 72 being located on top cross tie member 62 adjacent the upper end of the inner slide section 20. Latch member 71 comprises three-arm members 73, 74 and 75 in which arm 73 with respect to arm 74 and arm 74 with respect to arm 75 are disposed substantially at right angles. Arm 73 is profiled substantially mushroom-shaped at its outer end, as best viewed in Figures 8a and 8c, and includes thereby a pair of contacting surfaces 76 and 77. Arm 74 is substantially a straight arm forming, with arm 73, a bell crank arrangement, while arm 75 includes a projecting finger portion 78 having oppositely disposed contact surfaces 79 and 80. When the mast assembly 10 of our invention is fully lowered or in a down position, as shown in Figure 6 of the drawings, latch member 71, as shown in schematic Figure 8c, locks the inner slide section 20 against upward movement relative to the outer stationary mast section 12 and specifically, to the uppermost tie bar 15 thereon by engaging an ear portion 81 thereon with surface 76 of the lever arm 73; such ear portion 81 depending toward latch 71 from the tie bar 15. Latch member 71 is held in the position shown in Figure 8c by virtue of the engagement of its intermediate arm or lever portion 74 with a spring-loaded plunger 82 associated with tie bar 15 and which plunger 82 yieldingly urges lever 71 in a counterclockwise direction about pivot pin 72, as viewed in the drawing, to dispose shoulder 76 in opposed abutting relation to shoulder 81 of tie bar 15.

Figure 8A:
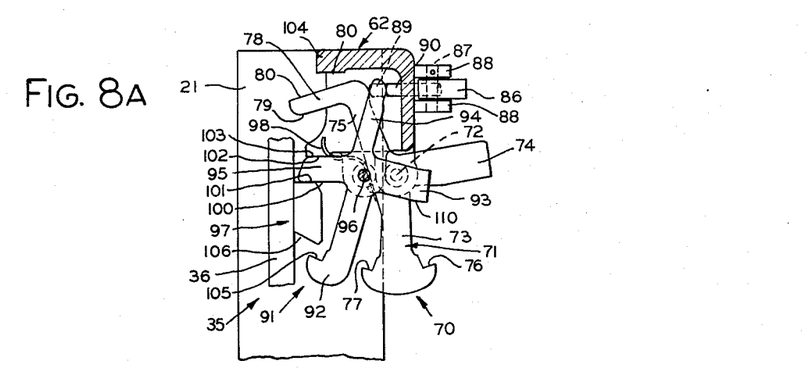
Figure 8B:
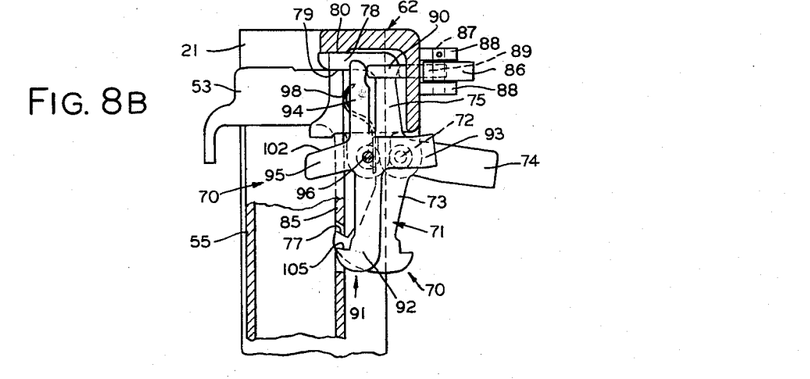
Figure 8C:
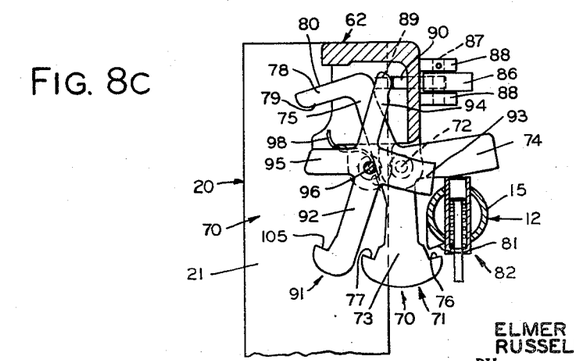

When the mast is in its fully lowered position, the latch members 71 and 91 and associated parts are in their positions shown in Figure 8c. At the start of the raising operation, the cross head 53 moves upward, accompanied by free upward travel of the carriage 35 for a predetermined distance and at a faster rate than cross head 53. The cross head 53 then contacts finger 78 of arm 75 of latch member 71 turning the latter clockwise. Arm 74 of latch member 71 compresses the spring of plunger 82 and bears upon the cross tie bar 15. The latch member 71 then functions as a lever and, through pivot pin 72, raises the cross tie member 62, and with it the innermost mast section, a short distance above cross head 53. As the cross head 52 moves upward a short distance further, the upper face 80 of finger 78 seats against the lower face of cross tie member 62, with the upper face of cross head 53 seating against the under face of finger 78. The parts are then disposed as shown in Figure 8b, with the cross tie member 62 released from the cross tie bar 15 and latched to piston rod 55, and the cross head 53 coupled to the cross tie member 62, with the carriage 35 travelling upward at a faster rate than the cross head 53 and the cross tie member 62. At this time, the latching of the cross tie member 62 to piston rod 55 guards against upward movement of the innermost mast section with the carriage, in the event of the latter tending to stick therein.

The carriage 35 continues travelling upward relative to cross head 53 and cross tie member 62 until a dog 97, mounted on one of the flanges 42 of apron 36 (Figure 5), contacts arm 95 of latch member 91, with the parts in their positions shown in Figure 8b. When that occurs, dog 97 turns latch member 91 clockwise, from its position of Figure 8b to its position of Figure 8a. Arm 94 of latch member 91 contacts the inner end of a plunger 90 at one end of a lever 86 pivoted at 87 between ears 88 on the cross tie member 62 (Figure 4). A plunger 89 at the other end of lever 86 contacts arms 75 of latch member 71. The clockwise turning of latch member 91 transmits pressure to arm 75 of latch member 71, through lever 86 and plunger 89. Finger 78 of latch member 71 is then fulcrumed on cross head 53 and latch member 71 functions as a lever exerting upward pressure, through pivot pin 72, on cross tie member 62. That raises the cross tie member 62 above cross head 53 a sufficient distance, as permitted by the clearance between shoulder 77 of latch member 71 and dog element 85 of piston rod 55, to enable turning of latch member 71 from its position of Figure 8b to its position of Figure 8a. Latch member 91 is then in its position shown in the latter figure, with latch surface or shoulder 105 underlying and spaced from carriage dog 97, the upper face 102 of arm 95 seating against the underface 103 of a downward extension of cross tie member 62, and the upper face of dog 97 seating on the underface of arm 95. The cross tie member 62 is now released from piston rod 55 and is coupled to the carriage 35 for upward travel therewith. Thereafter, the inner mast section 20 continues to move upward with the carriage 35 to desired extent. If the mast is to be fully extended, or substantially so, as the inner section continues its up travel, stop blocks 108, adjacent the lower end of that section, contact stop blocks 26, adjacent the upper end of the intermediate mast section, effective for raising the latter in the continued up travel of the innermost section 20.

When the mast has been raised as above described, the latch members 71 and 91 and associated parts are in their positions shown in Figure 8a. In lowering, the innermost and the intermediate mast sections normally move downward together at the same rate as the carriage 35. At that time, the latch member 91 is held in its position of Figure 8a by a weight member 110 associated with arm 93. In the event of the movable mast sections tending to stick for any reason, dog 97 of carriage 35 will engage surface or shoulder 105 of latch member 91 thereby assuring that they will be moved to lowered position, though normally that is not necessary. As the mast sections move downward, cross tie member 62 overtakes cross head 53. At that time the mast sections are approaching lowered position and finger 78 of latch member contacts cross head 53. Further down travel of the mast sections turns latch member 71 clockwise to its position of Figure 8b thereby turning latch member 91 to its position there shown, with shoulder 105 thereof disposed to clear carriage dog 97. The carriage 35 then continues its down travel and the movable mast sections also continue their down travel, with the latch members 71 and 91 and associated parts remaining in their positions shown in Figure 8b. As the mast sections and the carriage reach fully lowered position, arm 74 of latch member 71 contacts plunger 82 and then contacts cross rod 15. That turns latch member 71 counterclockwise to its position of Figure 8c, disposing surface or shoulder 77 thereof to clear dog element 85 of piston rod 55. During such turning of latch member 71 it functions as a lever for raising cross tie member 62 a distance above head 53 corresponding to the normal distance between surface or shoulder 77 of latch member 71 and the dog element 85 of piston rod 55, as shown in Figure 8b, the operation being the reverse of the releasing operation in connection with the raising of the mast, described above. The counterclockwise turning of the latch member 71 disposes surface or shoulder 77 thereof clear of dog element 85 of piston rod 55. The cross head 53 then moves down a short distance to the end of its down stroke, with the movable mast sections and the carriage then in their lowermost positions. The latch members 71 and 91 are then in their positions shown in Figure 8c, with the innermost mast section latched to the cross bar 15, as before. In the event of the innermost mast section 20 being latched to the piston rod 55 and pulled down thereby to lowered position, the cross head 53 will be spaced below the cross tie member 62 a distance equal to the normal distance between surface or shoulder 77 of latch member 71 and dog element 85 of piston rod 55, shown in Figure 8b. A spring 98, secured to latch member 71, is then biased by cross head 53 toward arm 75 of latch member 71 and is effective for maintaining cross tie member 62 latched to the piston rod 55. In such case the arm 74 of latch member 71 will contact plunger 82 and then the cross tie bar 15, thereby turning latch member 71 to its position of Figure 8c, as before, but without necessity of lifting the cross tie member 62 and the inner mast section 20. In either case, the latch member 71 is turned from its position of Figure 8b to its position of Figure 8c, as and for the purpose above stated. The movement of latch member to its position of Figure 8c causes movement of latch member 91 to its position there shown, but that is of no significance at that time.

The latching means above described comprises three pairs of latch elements. One pair includes surface or shoulder 76 of arm 73 of latch member 91 and ear 81 of cross bar 15, cooperating for latching the inner movable mast section 20 to the stationary outer section 12. A second pair of latch members includes the surface or shoulder 77 of arm 73 of latch member 71 and the dog portion 85 of piston rod 55 for latching cross tie member 62 and the inner movable mast section 20 to piston rod 55 and cross head 53. The third pair of latch elements includes the surface or shoulder 105 of arm 92 of latch member 91 and the dog 97 of the carriage 35, for latching the latter in its down travel to the movable inner section 20 of the mast. The several pairs of latch elements have their latching surfaces disposed in operative and inoperative relation with respect to each other as determined by the relative positions of the mast sections 17 and 20 and the ram means 51 or cross head 53, in the manner above described.

From the foregoing description, it is believed that those familiar with the art will recognize the unique features and operational functions of our improved mast assembly which embodies a novel nesting arrangement of two sets of I-beam members and the unique roller arrangement for withstanding bending stresses of the extensible mast. The activity, as described, of the unique latching arrangement permits successive tie-up between the innermost rail assembly 20 and the cross head 53 and the disengagement of such inner rail assembly from the piston rod at the point where the carriage assembly 35 is raised to the upper end of the inner rail assembly and coupled thereto. As described, this permits an upward movement of the inner rail assembly at a 1:1 lifting ratio relative to the movement of the ram piston rod 55 followed by a subsequent 3:1 lifting ratio as the inner rail assembly 20 moves with the load carriage assembly 35 in accordance with the activity of the moving chains 50, 50.

While we have herein shown the features of our improved mast assembly in association with a particular and preferred embodiment, it is nevertheless to be recognized that numerous changes, modifications and substitutions of equivalents may be made therein without necessarily departing from the spirit and scope of its inventive aspects. Therefore, it is not our intention to be limited to the particular form of the invention herein described and shown except as may appear in the following appended claims.

We claim:

1. In a hoist mechanism for lift trucks, the combination comprising a three section load lifting frame wherein said sections are in extensible telescoping relationship to one another, one of said sections being secured to the truck, a second or intermediate of said sections being extensible relative to said one section, and a third or inner of said sections being extensible relative to said second section and to said one section, a load carriage mounted in said third section and elevatable therealong, and ram means for actuating said load carriage upwardly along said third section, for elevating said third section relative to said first and second sections, and for elevating said second section relative to said first section, first and second latching means secured adjacent the upper end of said third section, and means operatively interconnecting said first and second latching means and adapted to dispose one of said latching means in an inoperative position when the other thereof is moved to an operative position and vice versa, said first latching means being adapted to be disposed in latching relation with said third section to prevent movement of said third section during initial upward movement of said carriage means along said third section, to then be adapted to be disposed in latching relation between said third section and said ram means during continued upward movement of the latter, and thereafter being disposed in non-latching relation with said third section and said ram means, said second latch means being adapted to first permit the passage of said carriage means to a position adjacent the top of said third section, and to then be disposed in latching relation between said third section and said carriage means, and the continued upward movement of said ram means moving said carriage means and said second and third sections upwardly together.

2. An extensible upright for lift trucks of the character described, comprising, a pair of laterally spaced apart stationary uprights attached at their base to the lift truck, said uprights being of substantially channel-shaped cross-section and having their channels opening towards one another in opposed relationship, a first pair of laterally spaced apart extensible uprights associated with said stationary uprights and movable longitudinally thereof, said first pair of extensible uprights being of substantially I-shaped cross-section and disposed in overlapping relation to said stationary uprights, a second pair of laterally spaced apart extensible uprights associated with said stationary uprights and said first pair of extensible uprights and movable longitudinally along said latter uprights relative to said stationary uprights, said second pair of uprights being of substantially I-shaped cross-section and disposed in overlapping relation to said first pair of extensible uprights, a load carriage, upper and lower rollers on said load carriage for guiding the same longitudinally of said second pair of extensible uprights, means for moving said load carriage relative to said uprights and the said extensible uprights relative to one another and relative to said stationary uprights, said means including plural chain and sheave wheel means and hydraulic ram means arranged to provide a continuous lifting ratio of 3 to 1 for said carriage means relative to the movement of the hydraulic ram means, and plural latching means arranged to successively effect a latching relation between said second pair of extensible uprights, said hydraulic ram means and said carriage means during extending movement of the upright assembly in such a manner that said carriage means is first actuated upwardly by said hydraulic ram means a distance along said second pair of extensible uprights which is less than the collapsed height thereof, said hydraulic ram means then actuating said second pair of extensible uprights at a 1:1 movement ratio relative thereto until said carriage means is lifted by said ram means to a position adjacent the upper end of said second pair of extensible uprights, said carriage means and said second pair of extensible uprights thereon being actuated upwardly together at a 3:1 movement ratio relative to said hydraulic ram means, and said first pair of extensible uprights being subsequently actuated upwardly at a 3:1 lifting ratio with said carriage means and with said second pair of extensible uprights.

3. An upright assembly for use with an industrial lift truck of the character described comprising, extensible frame means including a stationary upright section adapted to be secured to said lift truck, a plurality of movable sections disposed in telescopic relation with each other and with said stationary section for longitudinal movement with respect to each other and said stationary section, load carriage means mounted for longitudinal movement in one of said movable sections, ram means for moving said sections relative to each other and said load carriage means along said one movable section, latching means comprising a pair of first latch elements between said one movable section and said ram means, said ram means being adapted in one position thereof to dispose said first latch elements in operative relation with respect to each other, a pair of further latch elements between said one movable section and said load carriage means, said load carriage means being adapted in a predetermined position thereof to dispose said last named latch elements in operative relation with respect to each other, and additional latch elements between said stationary and one movable section for retaining the movable sections in their lower vertical positions and for operatively releasing the same at predetermined positioning of said ram means.

4. An upright assembly for use with an industrial lift truck of the character described comprising, extensible frame means including a stationary upright section adapted to be secured to said lift truck, a plurality of movable sections in telescopic relation with each other and with stationary section for longitudinal movement with respect to each other and said stationary section, said movable sections being adapted to be substantially contained within the vertical height of said stationary upright section in the lower vertical positions of said movable sections, load carriage means mounted for longitudinal movement in one of said movable sections, ram means for moving said sections relative to each other and said carriage along said one movable section, latching means comprising a pair of first latch elements between said stationary section and said one movable section for retaining said movable sections in their lower vertical positions, a pair of second latch elements between said one movable section and said ram means, said ram means being adapted in one position thereof to dispose said first latch elements in inoperative relation with respect to each other and effect actuation of said second latch elements to operative relation with respect to each other, and a pair of third latch elements between said one movable section and said load carriage means, and said load carriage means being adapted in a predetermined position thereof to dispose said third latch elements in operative relation with respect to each other.

5. An upright assembly for use with an industrial lift truck of the character described comprising, extensible frame means including a stationary upright section adapted to be secured to said lift truck, a plurality of movable sections in telescopic relation with each other and with said stationary section for longitudinal movement with respect to each other and said stationary section, said movable sections being adapted to be substantially contained within the vertical height of said stationary upright section in the lower vertical positions of said movable sections, load carriage means mounted for longitudinal movement in one of said movable sections, ram means for moving said sections relative to each other and said carriage along said one movable section, latching means comprising a pair of first latch elements between said sattionary section and said one movable section for retaining said movable sections in their lower vertical positions, a pair of second latch elements between said one movable section and said ram means, said ram means being adapted in one position thereof to dispose said first latch elements in inoperative relation with respect to each other and effect actuation of said second latch elements to operative relation with respect to each other, a pair of third latch elements between said one movable section and said load carriage means, said load carriage means being adapted in a predetermined position thereof to dispose said third pair of latch elements in operative relation with respect to each other, and means interconnecting one each of said second and third latch elements and being adapted to dispose said third latch elements in inoperative relation with respect to each other when said second latch elements are in operative relation with respect to each other, and vice versa.

6. An upright assembly for use with an industrial lift truck of the character described comprising, extensible frame means including a stationary upright section adapted to be secured to said lift truck, a movable section mounted in telescopic relation with said stationary section for longitudinal movement with respect to said stationary section, load carriage means mounted for longitudinal movement in said movable section, ram means for moving said movable section relative to said stationary section and for moving said carriage along said movable section, latching means comprising a pair of first latch elements between said stationary section and said movable section for positively retaining said movable section in its lower vertical position, a pair of second latch elements between said movable section and said ram means, said ram means being adapted in one position thereof to dispose said first latch elements in inoperative relation with respect to each other and effect actuation of said second latch elements to operative relation with respect to each other, and a pair of third latch elements between said movable section and said load carriage means, and said load carriage means being adapted in a predetermined position thereof to dispose said third latch elements in operative relation with respect to each other.

7. The combination of claim 6 characterized by the provision of means interconnecting one each of said second and third latch elements and being adapted to dispose said third latch elements in inoperative relation with respect to each other when said second latch elements are in operative relation with respect to each other, and vice versa.

8. The combination of claim 7 characterized by one of said latch elements of said pair of first latch elements and one of said latch elements of said pair of second latch elements being formed in a member pivotally mounted on said movable section, and in which one of said latch elements of said pair of third latch elements is formed in a member pivotally mounted on said movable section.

References Cited in the file of this patent

UNITED STATES PATENTS

| | | |
|---|---|---|
| 2,419,938 | Abbe | May 6, 1947 |
| 2,514,052 | Gunning | July 4, 1950 |
| 2,595,120 | Barnes | Apr. 29, 1952 |
| 2,627,943 | Hastings | Feb. 10, 1953 |
| 2,701,031 | Brumbaugh | Feb. 1, 1955 |